Figure 1:
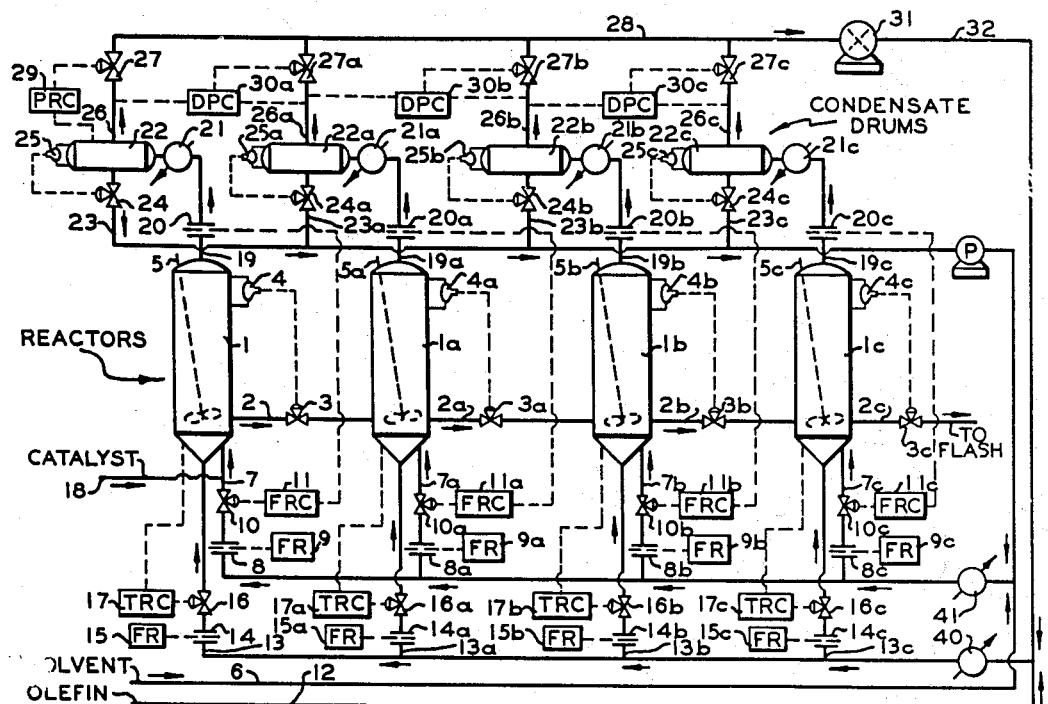

April 4, 1961   F. T. SHERK   2,978,441
POLYOLEFIN REACTOR CONTROL
Filed May 23, 1957

INVENTOR.
F. T. SHERK
BY Hudson & Young
ATTORNEYS

United States Patent Office 2,978,441
Patented Apr. 4, 1961

2,978,441

POLYOLEFIN REACTOR CONTROL

Fred T. Sherk, Bartlesville, Okla., assignor to Phillips Petroleum Company, a corporation of Delaware Filed May 23, 1957, Ser. No. 661,148

8 Claims. (Cl. 260—93.7)

This invention relates to low pressure polymerization of aliphatic olefins. In one of its aspects, this invention relates to a novel control method for a plurality of polymerization reactors in series.

It has recently been discovered that highly crystalline, high molecular weight, polymers of relatively high density and high melting point can be produced by polymerizing certain olefins, including ethylene, in the presence of a hydrocarbon diluent and a catalyst.

One method for preparing such highly crystalline materials is set forth in the copending application of Hogan and Banks, Serial No. 573,877, filed March 26, 1956, now Patent No. 2,825,721. Polymers according to that application are produced by polymerizing 1-olefins, having a maximum of eight carbon atoms per molecule and no branching nearer the double bond than the four-position, either alone or with other olefins, by contacting with a solid catalyst containing as an essential catalytic ingredient, chromium oxide associated with at least one porous oxide selected from the group consisting of silica, alumina, zirconia, and thoria. Suitable olefins are ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene and the like. These materials can be polymerized alone or in admixture with each other to obtain solid or semisolid polymers. Also these olefins can be polymerized with other aliphatic olefins such as butene-2 and butadiene. It is preferred that the chromium content of the catalyst be within the range 0.1 to 10 weight percent and it is highly preferable that an appreciable proportion of the chromium be in the hexavalent state. The catalyst is finely divided and can be microspheroidal although catalysts having particle sizes up to 40 mesh can be employed satisfactorily. A highly desirable catalyst is a chromium oxide catalyst associated with at least one additional oxide of the type already mentioned. A catalyst often preferred is one which the oxide or oxides other than chromium oxide have been treated with a fluoride, e.g., a volatile fluoride, such as hydrogen fluoride, followed by heating to remove residual volatile fluorides. A further improvement can be effected by the presence of strontium oxide in the catalyst, as set forth in more detail in the copending application of Hogan and Banks, Serial No. 433,804, filed June 1, 1954, now Patent No. 2,846,425. As has been indicated, the preferred chromium content of the chromium oxide catalyst is in the range 0.1 to 10 weight percent and it is further preferred that at least 0.1 weight percent of the catalyst be chromium in the hexavalent state.

The catalyst can be maintained in suspension in the reaction mixture by any suitable agitation means. The reaction temperature in the Hogan and Banks method is preferably in the range 250 to 357° F., although temperatures outside this range can be used. For example, in the copending application of Leatherman and Detter, Serial No. 590,567, filed June 11, 1956, a process is described for polymerizing such olefins in the presence of a chromium oxide catalyst of the type described at a temperature below the solution temperature of the polymer, e.g., as low as 150° F. or even lower so that the polymer is formed as discrete particles. In either case, solution or diluent processes, the pressure will be sufficient to maintain the hydrocarbon diluent or solvent in liquid phase. For convenience, the solvent or diluent will hereinafter be referred to as diluent since even when acting as a solvent, this hydrocarbon also serves as a diluent for the reaction. While vapor phase reaction can be employed, the instant invention pertains to those polymerizations employing a liquid diluent and the reactor effluent is passed to a flash zone wherein unreacted monomer is removed by flashing. In the solution process, the flashed material is frequently filtered to remove catalyst. In the particle form process (polymer formed as discrete particles) the production per pound of catalyst is exceedingly high and generally no catalyst removal step is required. The polymer can suitably be recovered from solution or diluent by admixing the effluent with relatively cool water which results in polymer precipitation in case of solution and steam stripping the polymer to remove hydrocarbon diluent after which the polymer is dried, remelted, extruded and cut into pellets. Other recovery methods can be employed such as by solvent evaporation, cooling solvent to below the precipitation temperature of the polymer, etc., however, this is not a part of the present invention and requires no further discussion here.

Polyethylene produced by the process just outlined will ordinarily have a molecular weight in the range 35,000 to 100,000 or even higher in case of particle form, e.g., up to 200,000 or higher, a density in the range 0.95 to 0.97, e.g. approximately 0.96, and a crystallinity exceeding 90 percent. The tensile strength of the polymer, as produced, will ordinarily be of the order 4,000 to 5,000 p.s.i., but can be higher or lower. The tensile strength is greatly improved by orienting by cold drawing methods. The polymer ordinarily has a softening point of about 265° F. or higher. Polymers produced by this process have unsaturation preponderantly of the terminal vinyl and/or trans-internal structure. So-called "branched vinyl" unsaturation is substantially absent. These terms are more fully discussed in the cited Hogan and Banks application.

Another suitable method (though less preferred and nonequivalent) of preparing low pressure or highly crystalline polymer is polymerizing such olefins by contacting with a catalyst such as a mixture of a compound represented by the formula $AlR_3$, wherein R is a saturated aliphatic, cycloaliphatic or aromatic hydrocarbon radical or hydrogen; and a second component which is ordinarily a halogen compound of a metal such as titanium, zirconium, chromium, or molybdenum. An example of such a catalyst comprises a mixture of a compound represented by the formula $R_mAlX_n$, wherein R is a hydrocarbon radical of the type previously described, X is a halogen, and $m+n=3$, i.e., the valence of aluminum. In connection with this type of catalyst, metal compounds such as titanium dxoide and the tetraalkoxides of titanium as well as tetravalent titanium salts of organic carboxylic acids can be utilized. An example of such a catalyst is a mixture of diethylaluminum chloride, ethylaluminum dichloride, and titanium tetrachloride. A similar type of catalyst mixture comprises a halide of a group IV metal, e.g., titanium tetrachloride and a free metal, such as metallic sodium or metallic magnesium. The polymerization reaction is ordinarily conducted at a temperature which can range from room temperature up to approximately 300° C. The reaction is preferably conducted with the olefin in admixture with a hydrocarbon such as isooctane, cyclohexane, or toluene which is inert and non-deleterious to the catalyst under the reaction conditions. The pressure is ordinarily sufficient to maintain the inert hydrocarbon substantially in the liquid phase. The reactor effluent is ordinarily treated with a compound such as methanol, acetone, acetic acid, or water which decomposes the remaining catalyst, and the polymer is recovered by vaporization of the hydrocarbon solvent or by precipitation of the polymer by cooling. Polymers produced by this general type of process will have molecular weights of the same order as those produced by the chromium oxide catalyst, a crystallinity of 80 to 85 percent and densities of about 0.95.

While both of the foregoing types of polymerization can be carried out in batch processes, it is often preferred to carry out such processes continuously. In a continuous process, it is frequently preferred to carry out the reaction in a plurality of reactors in series. It is to such a series, that the instant invention is particularly adaptable. Heretofore, various control systems have been proposed for the polymerization of olefins wherein the various feed stream rates to the reactor, such as olefins, catalyst and diluent, are regulated by the reactor variables. However, none of the proposed systems combine a series of controls that not only maintain constant temperature and pressure within the reactor, but also provide for maximum polymerization within a plurality of reactors that are connected in series.

It is an object of this invention to provide a method of automatically controlling the polymerization of olefins in a series of reactors.

It is another object of this invention to provide for maximum polymerization of olefins in a series of reactors while controlling reaction conditions within the reactors.

Still other objects, features and advantages of this invention will be apparent to those skilled in the art upon examining this specification and the claims.

According to this invention, catalyst is fed at a constant rate to the first series of reactors, monomer is fed to each reactor responsive to temperature changes in said reactors and diluent is fed to each reactor responsive to changes in flow of gases from each reactor.

To illustrate the invention, a typical embodiment will be described. Catalyst is fed at a predetermined rate to the first reactor of a series. Monomer is fed to each reactor of the series responsive to temperature changes in the particular reactor. This is accomplished by a temperature sensing probe located in the reactor and any change in temperature is transmitted to a temperature recorder controller which in turn actuates a motor valve on the monomer conduit to either increase or decrease the rate of addition. A flow recorder controller is operably installed on the off-gas conduit from the reactor so as to actuate a motor valve on the diluent inlet conduit to either increase or decrease the rate of flow of diluent to the reactor responsive to changes in the off-gas flow. A liquid level controller on each of the reactors controls the withdrawal of the reactor effluent. Thus, by controlling the amount of liquids entering the reactor, the desired residence time for each reactor can be effectively controlled, thereby insuring a constant and maximum polymerization in each zone.

To further illustrate the invention, a case is assumed wherein ethylene is being polymerized in pentane slurry in the presence of a chromium oxide catalyst. Now if the catalyst activity falls off, say due to catalyst poisons in the system, the temperature in the reactor will decrease due to the decrease in the rate of polymerization. The decrease in temperature will be sensed by the temperature probe in the reactor which in turn will cause the flow recorder controller to decrease the amount of ethylene being supplied to the reactor. The decrease in temperature will also have an effect on the amount of off-gas (essentially pentane and ethylene) that is emitted from the reactor. Since the total volume of liquids and gases fed to the reactor (pentane and ethylene) has been substantially reduced, the liquid level controller will reduce the rate at which the effluent is withdrawn. However, at all times, the catalyst feed is constant, thereby increasing the ratio of catalyst to diluent and ethylene when such a temperature reduction is realized. This increased ratio causes the reaction rate to increase and the temperature to rise, due to the increased reaction rate, thereby causing the flow rate of the ethylene to the reactors to increase. Since the normal reaction mixture is a saturated solution of ethylene in diluent, the increase of ethylene fed provides for more off-gases and greater dissipation of heat.

Thus, it will be noticed that maximum productivity (pounds of polymer per pound of catalyst) is obtained while maintaining temperature control at all times.

Figure 2:
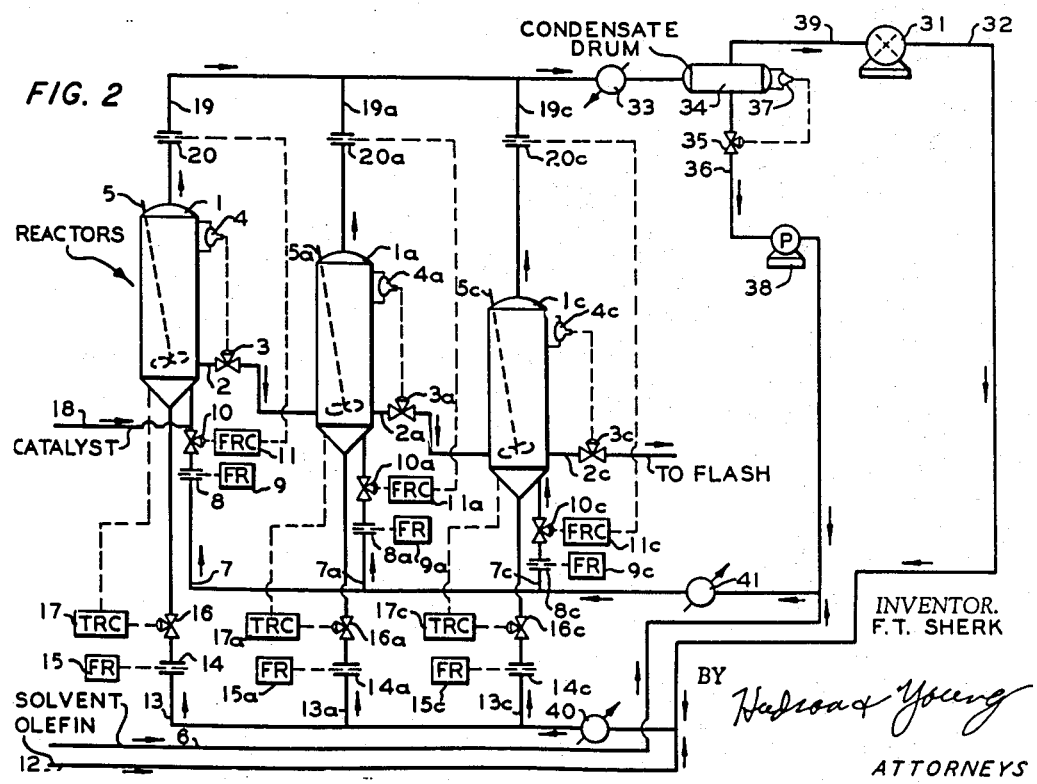

This invention will be further described in conjunction with the attached drawing of which:

Figure 1 is a schematic flow diagram of one embodiment of the invention wherein each reactor is provided with a condensate vessel and Figure 2 is a schematic flow diagram of another embodiment wherein each reactor utilizes a common condensate vessel.

Referring now to the drawings, reactors 1, 1a, 1b, and 1c are connected in series via conduit 2 which have operably installed therein motor valves 3. The same numeral is applied to like pieces of apparatus with a subfixed letter associating the particular apparatus with the particular reactor. Also operably connected to each reactor is a liquid level controller 4 which is, in turn, operably connected to said motor valves 3 to maintain the liquid level in said reactors substantially constant at a predetermined level. The conduit 2c from the last reactor 1c passes to monomer flash zone (not shown). Each reactor is provided with a stirrer 5. As has been indicated, the heat of reaction is dissipated by evaporation of diluent and monomer, however, it is within the scope of this invention to use indirect cooling means such as a jacket or coils for additional cooling, if desired.

Diluent from conduit 6 is fed to each reactor via conduits 7. In each conduit 7 is installed an orifice 8 which is operably connected to flow recorder 9. Also installed in each conduit 7 is a motor valve 10 operably connected to a flow rate controller 11. This flow rate controller is operably connected to an orifice in the reactor off-gas conduit as described hereinafter. The monomer from conduit 12 passes to each reactor via conduit 13. Each conduit 13 has an orifice 14 operably connected to flow recorder 15 installed therein. Also each conduit 13 has installed therein a motor valve 16 operably connected to temperature-recorder-controller 17. The temperature-recorder-controller are operably connected to a temperature sensing probe operably installed in each reactor. Catalyst from conduit 18 is fed at a predetermined constant rate to solvent conduit 7 entering reactor 1a. The off-gas from each reactor is taken off via conduits 19 through orifices 20 which are operably connected to flow rate controller 11. According to the embodiment of Figure 1, the off-gas passes through condensers 21 to accumulator 22 wherein the non-condensed monomers are separated from the condensed diluent. The diluent is recycled to diluent conduit 6 via conduits 23 and motor valves 24. The motor valves 24 are operably connected to liquid level controllers 25 which are in turn operably connected to accumulators 22. The ethylene from condensate drums passes overhead via conduits 26 and motor valves 27 to header conduit 28. The motor valve 27 associated with accumulator 22 of reactor 1 is operably connected to pressure-recorder-controller 29 which is operably connected to accumulator 22 associated with reactor 1. The remaining motor valves 27 are operably connected to pressure drop controllers 30 which are operably connected between pairs of conduits 26. By setting these pressure controllers at predetermined values, a pressure drop is maintained across the system permitting flow of fluids from one reactor to the other. The monomer in conduit 28 is recycled via blower 31 and conduit 32 to monomer conduit 12.

In the embodiment of Figure 2, the flow of fluids from one reactor to the other is dependent upon gravity and a pressure drop control is not required. In this embodiment, the conduits 19 enter header 28 and the off-gas passes to condensers 33 and condensate drum or accumulator 34. The condensed diluent passes via motor valve 35, conduit 36 and pump 38 to solvent conduit 6. The motor valve 35 is operably connected to liquid level controller 37 which is in turn operably connected to vessel 34 to maintain the level therein. The uncondensed monomer passes overhead via conduit 39, blower 31 and conduit 32 to olefin conduit 12. The olefin in both embodiments is heated in heat exchanger 40 prior to being introduced to the reactors. Also the diluent is heated in heat exchangers 41 prior to being introduced to the reactors. It is, of course, within the skill of the art to omit these heaters, if desired.

In the above description, valves, pumps, etc., except where necessary to describe the invention have not been indicated, it being within the skill of the art to supply same.

Specific embodiment

This invention will be illustrated in an embodiment wherein ethylene is being polymerized in a pentane slurry in the presence of a chromium oxide catalyst. This catalyst is a 2.6 weight percent chromium oxide catalyst on a 90/10 silica/alumina porous support. The catalyst is activated at 950° F. for a period of about four hours in the presence of a stream of dry air prior to using. Reference is made to Figure 2. The reactors contain 400 cubic feet of slurry and operate at 400 p.s.i. and 210° F. Assuming a catalyst of normal activity, 1.54 pounds of catalyst per hour is fed to reactor 1 via conduit 18 along with 2,148 pounds of ethylene and 13,732 pounds of pentane from conduit 7. At the same time 8,592 lbs. of ethylene and 2,261 pounds of pentane enters reactor 1 via conduit 13. The gaseous effluent from reactor 1 via conduit 19 consists of 9,897 pounds of ethylene and 11,876 pounds of pentane while the liquid effluent via conduit 2, feed to reactor 1a, consists of 286 pounds ethylene, 4,117 pounds pentane, 557 pounds polymer and 1.54 pounds catalyst. Also entering reactor 1a via conduit 7a is 2,444 pounds ethylene and 15,626 pounds pentane and via conduit 13a, 8,592 pounds of ethylene, and 12,099 pounds pentane. Leaving reactor 1a via conduit 2a is 1,114 pounds polymer, 1.54 pounds catalyst, 9,910 pounds pentane and 689 pounds ethylene which enter reactor 1c. Also entering reactor 1c are 1,238 pounds ethylene and 7,896 pounds pentane via conduit 7c and 8,592 pounds ethylene and 2,262 pounds pentane via conduit 13c. Leaving reactor 1c via conduit 19c are 9,347 pounds of ethylene and 11,214 pounds pentane and via conduit 2c are 615 pounds ethylene, 8,854 pounds pentane, 1,671 pounds polymer and 1.54 pounds catalyst. The overhead streams 19, 19a and 19c from the reactors pass to cooler 33 wherein 6,300,000 B.t.u./hr. are removed and then pass onto condensate drum 34. The overhead from condensate drum 34 consists of 23,490 pounds ethylene and 6,784 pounds pentane at 110° F. and 350 p.s.i. The pressure is raised to 450 p.s.i.a. by compressor 31 and this is mixed with 2,286 pounds ethylene from conduit 12. This mixture then passes to reactors 1, 1a and 1c via conduits 13, 13a and 13c as indicated. The condensate from drum 34 consisting of 5,830 pounds ethylene and 28,400 pounds pentane passes via conduit 36 and pump 38 to conduit 6 where it is mixed with 8,854 pounds pentane and passed to the reactors 1, 1a, and 1c via conduits 17, 7a and 7c respectively. It will be noted that 557 pounds polymer is produced in each reactor. It will also be noticed that the polymer concentration is about 15 weight percent of the total slurry. Now if the catalyst activity should fall off for any reason, the temperature of the reactor contents will fall and the temperature recorder controller 17 will be activated to reduce the flow of monomers to the reactors. This in turn will provide less excess monomer and therefore reduce the overhead from the reactors resulting in less flow of gases through orifices 20 thereby causing flow rate controllers 11 to activate motor valves 10 to reduce the flow of solvent to the reactors. Since the liquid level in each reactor is controlled, the residence time of the catalyst is prolonged resulting in the same total production of polymer in each reactor. This, of course, results in a higher polymer concentration in the effluent stream. If it is desired to maintain the concentration level substantially the same, make-up solvent can be added to stream 2c, or the catalyst rate can be increased. In case of increased catalyst rate, or the regain of catalyst activity, the temperature will again rise causing a reversal of the control cycles so that the concentration is corrected.

Those skilled in the art will see many modifications which can be made in the operation and apparatus of this invention and still obtain the advantages thereof.

I claim:

1. In the polymerization of olefins in the presence of a diluent and catalyst in a series of vessels wherein catalyst, monomer and diluent is added to the first reactor of said series and additional monomer and diluent is added to each subsequent reactor and wherein the heat of reaction is removed at least in part from each reactor by evaporation of monomer, the improvement comprising maintaining a constant liquid level in each reactor, controlling the rate of monomer introduction to each reactor directly responsive to temperature changes in said reactor and the rate of diluent introduction to each reactor directly responsive to flow of overhead gases from said reactor thereby maintaining the production rate substantially constant.

2. In the polymerization of 1-olefins of 2 to 8 carbon atoms per molecule and having no branching nearer the four position in the presence of a catalyst and a diluent in a series of vessels and wherein the process comprises adding all of the catlayst to the first reactor, adding monomer and diluent to each reactor, evaporating at least a portion of the monomer as overhead from each reactor, passing liquid diluent and polymer formed successively from one reactor to the next succeeding reactor, and removing product from the last of the reactors, the improvement comprising continuously detecting the temperature of each reactor, controlling the rate of monomer to each reactor directly proportional to changes in the detected temperature, continuously detecting the flow of overhead gases from each reactor, controlling the rate of solvent addition to each reactor directly proportional to changes in the detected flow of overhead gases and maintaining the volume of liquid in each said reactor substantially constant.

3. The process of claim 2 wherein the overhead gases from each reactor are cooled to a temperature below the condensation temperature of solvent, separating monomer from condensed solvent, admixing fresh monomer with separated monomer, returning the admixture to said reactors, admixing makeup solvent with condensed solvent and returning the admixture to the said reactors.

4. The process of claim 3 wherein the rate of catalyst fed to the said first reactor is substantially constant.

5. An apparatus for polymerizing olefins in presence of a diluent and a catalyst comprising, in combination, a plurality of reactors in series, means for passing product, diluent and catalyst from each reactor to the next reactor in series, means for withdrawing product, diluent and catalyst from the last reactor of the series, means for introducing catalyst to the first reactor of the series, means for introducing 1-olefins to each reactor of the series, means for introducing diluent to each reactor of the series, means for withdrawing vapor overhead from each reactor of the series, means for maintaining a substantially constant liquid level in each reactor of the series means for sensing the temperature of each reactor of the series, means responsive to changes in the sensed temperature for regulating the flow of 1-olefins to said reactor proportional to said changes, means for sensing the flow of overhead vapor from each reactor in the series and means responsive to said changes in said flow for regulating the flow of diluent to said reactor proportional to said change.

6. An apparatus for polymerizing 1-olefins in the presence of a liquid diluent and a catalyst comprising in combination, a plurality of reactors in series, means for passing product, diluent and catalyst mixture from each reactor to the next reactor in the series, means for withdrawing product, diluent and catalyst mixture from the last reactor of the series, liquid level detecting means in each said reactor, means operably connected to said liquid level means for controlling the withdrawal of product, diluent and catalyst mixture from each said reactor responsive to changes in the detected liquid level to maintain said liquid level substantially constant, means for introducing catalyst at a predetermined rate to the first of said reactors of the series, means for introducing 1-olefin monomer to each said reactor, means for introducing diluent to each said reactor, overhead means for withdrawing vapor from each said reactor, means for detecting temperature in each said reactor, means associated with each said temperature detecting means operably connected to the associated means for introducing monomer to each said reactor to regulate the rate of monomer introduction directly proportional to changes in temperature detected to maintain said temperature substantially constant, means for detecting the rate of vapor removal from each said reactor associated with each said means for removal of vapor, means associated with each vapor removal detecting means operably connected to the associated means for introducing diluent to each said reactor to control the rate of diluent introduction directly proportional to changes in the detected rate of vapor removal, means for partially condensing the vapor removed from each said reactor, means for separating the condensed material from the uncondensed material, means for returning the condensed material to the reactor via the means for introducing solvent and means for returning the uncondensed portion to the said reactors via the means for introducing 1-olefins.

7. The apparatus of claim 6 wherein the means for partially condensing the withdrawn vapors in a sole means.

8. The apparatus of claim 6 wherein the means for partially condensing the withdrawn vapor is a plurality of such means each associated with a reactor.

References Cited in the file of this patent
UNITED STATES PATENTS

| | | |
|---|---|---|
| 2,518,307 | Groebe | Aug. 8, 1950 |
| 2,618,626 | Van Dijh et al. | Nov. 18, 1952 |
| 2,684,326 | Boyd | July 20, 1954 |
| 2,726,231 | Field et al. | Dec. 6, 1955 |
| 2,728,754 | Evering et al. | Dec. 27, 1955 |
| 2,440,822 | Hachmuth | May 4, 1958 |
| 2,897,247 | Marak | July 28, 1959 |